United States Patent [19]

McGinniss et al.

[11] Patent Number: 5,925,457
[45] Date of Patent: *Jul. 20, 1999

[54] THERMALLY-PROTECTIVE INTUMESCENT COATING

[75] Inventors: Vincent D. McGinniss, Sunbury; Richard J. Dick, Columbus; Robert E. Russell, III, Newark, all of Ohio; Stephen D. Rogers, Bowie, Md.

[73] Assignee: Battelle Memorial Institute, Columbus, Ohio

[ * ] Notice: This patent is subject to a terminal disclaimer.

[21] Appl. No.: 08/776,548

[22] PCT Filed: Aug. 1, 1995

[86] PCT No.: PCT/US95/09761

§ 371 Date: May 19, 1997

§ 102(e) Date: May 19, 1997

[87] PCT Pub. No.: WO96/03854

PCT Pub. Date: Feb. 15, 1996

Related U.S. Application Data

[63] Continuation-in-part of application No. 08/284,362, Aug. 2, 1994, Pat. No. 5,487,946.

[51] Int. Cl.$^6$ .................. B32B 7/00; B32B 27/18
[52] U.S. Cl. ............. 428/341; 427/228; 427/393.3; 428/411.1; 428/920; 428/921; 252/606; 252/607
[58] Field of Search ............... 427/393.3, 408, 427/397.8, 228; 428/413, 447, 448, 452, 704, 920, 921, 411.1, 341, 322.7; 252/601, 604, 606, 607; 106/15.05, 18.11, 18.13, 18.14, 18.15, 18.16, 18.17, 18.21

[56] References Cited

U.S. PATENT DOCUMENTS

| | | | |
|---|---|---|---|
| 3,669,299 | 6/1972 | Jones et al. | 220/10 |
| 3,714,047 | 1/1973 | Marion et al. | 252/62 |
| 3,915,777 | 10/1975 | Kaplan | 427/413 |
| 3,955,987 | 5/1976 | Schaar et al. | 106/15 |
| 4,069,075 | 1/1978 | Billing et al. | 156/82 |
| 4,179,298 | 12/1979 | Nelson et al. | 106/18.21 |
| 4,292,358 | 9/1981 | Fryer et al. | 428/135 |
| 4,324,835 | 4/1982 | Keen | 521/54 |
| 4,632,865 | 12/1986 | Tzur | 428/304.4 |
| 4,636,538 | 1/1987 | Malcolm-Brown | 523/179 |
| 4,663,226 | 5/1987 | Vajs et al. | 428/305.5 |
| 4,725,457 | 2/1988 | Ward et al. | 427/385.5 |
| 4,857,364 | 8/1989 | von Bonin | 427/255 |
| 4,879,066 | 11/1989 | Crompton | 252/606 |
| 5,004,632 | 4/1991 | McGarvey et al. | 427/410 |
| 5,323,682 | 6/1994 | Keenan | 89/1.11 |
| 5,487,946 | 1/1996 | McGinniss et al. | 428/413 |
| 5,603,990 | 2/1997 | McGinniss et al. | 427/393.3 |

*Primary Examiner*—Diana Dudash
*Attorney, Agent, or Firm*—Klaus H. Wiesmann

[57] ABSTRACT

An intumescent coating system and method therefor is disclosed for thermally protecting a substrate having a surface exposed to fire conditions. The coating system of the present invention is provided as having a first component which forms a rigid carbonific char foam having toughness and rigidity, and a second component which forms an insulative carbonific char foam having a density about half the density of the rigid carbonific foam to give insulation properties. The two foam components may be separately provided in a laminate-type arrangement as, respectively, an inner coating layer coated and cured on the surface of the substrate to form an inner film layer, and an outer coating layer coated and cured on the inner film layer to form an outer film layer. Alternatively, the two foams may be provided as being formed from components blended to comprise a single coating layer which is coated and cured on the surface of the substrate to form a film layer. In providing two foam components, one protecting the substrate from breakthrough and direct exposure to the fire conditions, and the other insulating the substrate to protect it from conductive, radiant, and/or convective heating by the fire conditions, the present invention affords a capability to offer flame retardancy at film thicknesses of less than 1.27 mm (50 mils).

21 Claims, No Drawings

THERMALLY-PROTECTIVE INTUMESCENT COATING

This application is a 371 of PCT/US95/09761, now WO 96/03,854, filed Aug. 1, 1995; which is a C.I.P. of U.S. application Ser. No. 08/284,362 filed Aug. 2, 1994 (now U.S. Pat. No. 5,487,946).

The Government of the United States has rights in this invention under contract No. A4124-900.

BACKGROUND OF THE INVENTION

The present invention relates to intumescent coatings, such as those used as paints and the like, and to methods utilizing such coatings for fire retardance. For structures fabricated from polymeric materials and the like, flame spread and thermal decomposition generally is accelerated to the point that normal fire fighting response times are inadequate to prevent significant combustion of the structure. Accordingly, intumescent coatings have been employed as paints to form a protective layer on the surface of such structures. As the name implies, intumescent coatings bubble when exposed to flames and produce an insulative layer of char and char foam.

The relatively low tendency for elemental carbon to oxidize has led to its incorporation into intumescent coatings. In this regard, highly-flammable substrates can be thermally-protected by application of a surface coating having ingredients catalyzed to be pyrolized into a carbonific char. Thus, the coating is converted from an oxidizable composition into elemental carbon. Broadly, such coatings comprise a polyhydric organic compound, an acid forming catalyst, and a blowing agent which intumesces the carbonific char formed from the acid-catalyzed pyrolysis of the polyhydric compound into a carbonific char foam having a relatively low thermal conductivity.

On its own, a pure carbon foam would not be expected to provide optimal thermal insulation. Consequently, the carbon foam often is supplemented with inorganic additives. Some inorganics, e.g., titanium dioxide and zinc oxide, provide nucleating sites for gas formation, resulting in fine cell, low density foam. Inasmuch as heat conduction through a gas can be several orders of magnitude lower than through a solid, a low density foam provides insulation improved over a higher density foam, especially when coated on a heat-conducting substrate such as a metal or a carbon-fiber composite. Additionally, several inorganics, including zirconium salts, borates, phosphates, and titanium dioxide, can contribute to the formation of a refractory layer over the top of the foam layer. The refractory layer advantageously provides an inert, highly infrared reflective layer, which can contribute significantly to the insulative properties of the foam. The infrared reflectance of the char also may be improved by the addition of inorganics having low emissivities such as titanium dioxide, zirconium dioxide, phosphate and antimonate glass. Other inorganics such as silica microballoons and silicone resins may be added to decrease heat conduction through the foam.

To form intumescent coatings having good integrity and offering resistance to high humidity, water-insoluble intumescent or char-forming agents, including selective salts of nitro aromatic amine compounds such as 4,4'-dinitrosulfanilimide, have been blended with epoxy-polysulfide or epoxy-chlorosulfonated polyethylene binder systems. Although such formulations are efficient intumescents, their efficiency is not optimized because the nitro aromatic intumescent species produces an exothermic char-forming reaction. To counter this exothermic effect, ablatives and endothermic fillers, including zinc borate and hydrated endothermic fillers such as aluminum hydroxide pigments, are beneficial.

The intumescent coatings heretofore known in the art have been used successfully to effectively reduce flame spread and to protect substrates from thermally-induced mechanical/chemical decomposition. Although these coatings have demonstrated significant fire retardant properties, they generally must be used at thicknesses, e.g., $\geq 5.08$ mm ($\geq 200$ mils), which precludes their use in applications where weight requirements are a consideration. Moreover, conventional coatings are not formulated to withstand exposure to the severe environments common in marine applications and the like, and often have ingredients which leach out after extended immersion in seawater. For certain applications, the intumescent reaction temperature of conventional formulations may be at or near the service temperature. Accordingly, there has existed and remains a substantial need for intumescent coating systems which not only will afford the requisite thermal insulation at minimum coating thicknesses and at elevated service temperatures, but which also will retain an insulative capability even after exposure to harsh marine environments and the like.

BRIEF DESCRIPTION OF THE INVENTION

A first aspect of the invention includes a coating system for thermally protecting a substrate having a surface exposed to fire conditions comprising: a first coating layer coated on the surface of the substrate and cured thereon to form a first film layer which layer is thermally decomposable upon exposure to the fire conditions to form a first carbonific char which char intumesces to form a first rigid carbonific char foam; and a second coating layer coated on the first film layer and cured thereon to form a second film layer which layer is thermally decomposable upon exposure to the fire conditions to form a second carbonific char which char intumesces to form an insulative carbonific char foam having a density about half the density of the first rigid carbonific char foam, the first rigid carbonific char foam forming where the insulative carbonific char foam has broken through to expose the first film layer to the fire conditions. Typically the insulative carbonific char foam has a density of between about 0.01 g/cm$^3$ and less than about 0.5 g/cm$^3$ and in some typical applications the first component is selected as having a density of between about 0.5 g/cm$^3$ and less than about 1.0 g/cm$^3$. In other typical embodiments the second coating layer comprises: a curable binder; a char promoter having hydroxyl groups; a dehydrating agent which is thermally decomposable to form an acid catalyst, the char promoter dehydrating in the presence of the acid catalyst to form an intermediate species which intermediate species is thermally decomposable to form the second carbonific char; and a spumific which is thermally decomposable to release a nonflammable, inert gas for foaming the second carbonific char into the insulative carbonific char foam, the spumific having a decomposition temperature higher than the decomposition temperatures of the dehydrating agent and the intermediate species. Typically the char promoter is a polyhydric alcohol and may be selected from the group consisting of pentaerythritol, dipentaerythritol, and derivatives and mixtures thereof; the dehydrating agent is an acid precursor which is thermally decomposable to form the acid catalyst and the acid precursor may be selected from the group consisting of ammonium phosphate, ammonium polyphosphate, phosphites, organophosphite esters, and derivatives and mixtures thereof; the spumific is a dicyandiamide or an azodicarbonamide; or the binder is selected from the group consisting of an epoxy, a polysulfide, a polysiloxane, a polysilarylene, and mixtures and derivatives thereof. Typically the first coating layer comprises an epoxy resin and a polysulfide.

In another typical embodiment the coating system of further comprises a third coating layer coated on the second film layer and cured thereon to form a third film layer which layer is thermally decomposable upon exposure to the fire conditions to form a third carbonific char which char intumesces to form a second rigid carbonific char foam having a density about twice the density of the insulative carbonific char foam, the insulative carbonific char foam forming under the second rigid carbonific char foam; and the third coating layer can typically comprise an epoxy resin and a polysulfide.

Alternatively, an embodiment includes a third coating layer formulated as a blend of the first and the second coating layers, the third coating layer being coated on the second film layer and cured thereon to form a third film layer which layer is thermally decomposable upon exposure to the fire conditions to form a third carbonific char which char intumesces to form a carbonific char foam blend having a first foam component and a second foam component having a density of about half the density of the first foam component, the insulative carbonific char foam forming under the carbonific char foam blend. Typically the second foam component has a density of between about 0.01 g/cm$^3$ and less than about 0.5 g/cm$^3$.

A further typical embodiment of the invention includes a method for thermally protecting a substrate having a surface exposed to a fire conditions comprising the steps of: coating the surface of the substrate with a first coating layer, curing the first coating layer on the surface of the substrate to form a first film layer which layer is thermally decomposable upon exposure to the fire conditions to form a first carbonific char which char intumesces to form a first rigid carbonific char foam; coating a second coating layer on the first film layer; and curing the second coating layer on the first coating layer to form a second film layer which layer is thermally decomposable upon exposure to the fire conditions to form a second carbonific char which char intumesces to form an insulative carbonific char foam having a density about half the density height of the first rigid carbonific char foam, the first rigid carbonific char foam forming where the insulative carbonific char foam has broken through to expose the first film layer to the fire conditions. Typically the insulative carbonific char foam has a density of between about 0.01 g/cm$^3$ and less than about 0.5 g/cm$^3$. In another embodiment thereof the second coating layer comprises: a curable binder, a char promoter having hydroxyl groups; a dehydrating agent which is thermally decomposable to form an acid catalyst, the char promoter dehydrating in the presence of the acid catalyst to form an intermediate species which intermediate species is thermally decomposable to form the second carbonific char; and a spumific which is thermally decomposable to release a nonflammable, inert gas for foaming the second carbonific char into the insulative carbonific char foam, the spumific having a decomposition temperature higher than the decomposition temperatures of the dehydrating agent and the intermediate species. Typically the char promoter is a polyhydric alcohol and the alcohol is selected from the group consisting of pentaerythritol, dipentaerythritol, and derivatives and mixtures thereof; the dehydrating agent is an acid precursor which is thermally decomposable to form the acid catalyst; the acid precursor is selected from the group consisting of ammonium phosphate, ammonium polyphosphate, phosphites, organophosphite esters, and derivatives and mixtures thereof; the spumific is a dicyandiamide or an azodicarbonamide; the binder is selected from the group consisting of an epoxy, a polysulfide, a polysiloxane, a polysilarylene, and mixtures and derivatives thereof; and/or the first layer comprises an epoxy resin and a polysulfide.

A further embodiment of the method includes the steps of: coating a third coating layer on the second film layer, and curing the third coating layer on the second coating layer to form a third film layer which layer is thermally decomposable upon exposure to the fire conditions to form a third carbonific char which char intumesces to form a second rigid carbonific char foam having a density about twice the density of the insulative carbonific char foam, the insulative carbonific char foam forming under the second rigid carbonific char foam. The method typically includes an insulative carbonific char foam having a density of between about 0.01 g/cm$^3$ and less than about 0.5 g/cm$^3$; the third coating layer comprising an epoxy resin and a polysulfide.

A yet further embodiment of the method includes the steps of coating a third coating layer on the second film layer, the third coating layer formulated as a blend of the first and the second coating layers; and curing the third coating layer on the second coating layer to form a third film layer which layer is thermally decomposable upon exposure to the fire conditions to form a third carbonific char which char intumesces to form a carbonific char foam blend having a first foam component, and a second foam component having a density about half the foam density of the first foam component, the insulative carbonific char foam forming under the carbonific char foam blend.

A yet further embodiment of the invention typically includes a coating composition for thermally protecting a substrate having a surface exposed to a fire conditions on which the composition is coated and cured to form a film layer, said composition comprising a blend of: a first component which is curable to form a first portion of the film layer, the first portion being thermally decomposable to form a first carbonific char which char intumesces to form a rigid carbonific char foam; and a second component which is curable to form a second portion of the film layer blended with the first portion, the second portion being thermally decomposable to form a second carbonific char which char intumesces to form an insulative carbonific char foam blended with the rigid carbonific char and having a density about half the density of the rigid carbonific char foam. Typically the insulative carbonific char foam has a density of between about 0.01 g/cm$^3$ and less than about 0.5 g/cm$^3$ and the rigid carbonific char foam is selected as having a density of between about 0.5 g/cm$^3$ and about 1.0 g/cm$^3$. Typically the coating composition is 75% by weight of the first component and 25% by weight of the second component.

In yet other embodiments the second component comprises: a curable binder; a char promoter having hydroxyl groups; a dehydrating agent which is thermally decomposable to form an acid catalyst, the char promoter dehydrating in the presence of the acid catalyst to form an intermediate species which intermediate species is thermally decomposable to form the second carbonific char; and a spumific which is thermally decomposable to release a nonflammable, inert gas for foaming the second carbonific char into the insulative carbonific char foam, the spumific having a decomposition temperature higher than the decomposition temperatures of the dehydrating agent and the intermediate species. Typically the char promoter is a polyhydric alcohol; the alcohol is selected from the group consisting of pentaerythritol, dipentaerythritol, and derivatives and mixtures thereof; the dehydrating agent is an acid precursor which is thermally decomposable to form the acid catalyst; the acid precursor is selected from the group consisting of ammonium phosphate, ammonium polyphosphate, phosphites, organophosphite esters, and derivatives and mixtures thereof; the spumific is a dicyandiamide or an azodicarbonamide; the binder is selected from the group consisting of an epoxy, a polysulfide, a polysiloxane, a polysilarylene, and mixtures and derivatives thereof; and the first component can comprise an epoxy resin and a polysulfide.

Yet another embodiment includes a method for thermally protecting a substrate having a surface exposed to a fire conditions comprising the steps of: (a) coating the surface of the substrate with a coating layer comprising a blend of: (i) a first component which is curable to form a first portion of a film layer, the first portion being thermally decomposable to form a first carbonific char which char intumesces to form a rigid carbonific char foam; and (ii) a second component which is curable to form a second portion of the film layer blended with the first portion, the second portion being thermally decomposable to form a second carbonific char which char intumesces to form an insulative carbonific char foam blended with the rigid carbonific char and having a density about half the density of the rigid carbonific char foam, and (b) curing the coating layer on the surface of the substrate to form the film layer. Typically the insulative carbonific char foam has a density of between about 0.01 g/cm$^3$ and less than about 0.5 g/cm$^3$ and the rigid carbonific char foam of the first component is selected as having a density of between about 0.5 g/cm$^3$ and less than about 1.0 g/cm$^3$. In other embodiments the composition comprises 75% by weight of the first component and 25% by weight of the second component.

A yet further embodiment of the latter method includes a second component of the composition comprising: a curable binder; a char promoter having hydroxyl groups; a dehydrating agent which is thermally decomposable to form an acid catalyst, the char promoter dehydrating in the presence of the acid catalyst to form an intermediate species which intermediate species is thermally decomposable to form the second carbonific char; and a spumific which is thermally decomposable to release a nonflammable, inert gas for foaming the second carbonific char into the insulative carbonific char foam, the spumific having a decomposition temperature higher than the decomposition temperatures of the dehydrating agent and the intermediate species. Typically the char promoter is a polyhydric alcohol; the alcohol is selected from the group consisting of pentaerythritol, dipentaerythritol, and derivatives and mixtures thereof; the dehydrating agent is an acid precursor which is thermally decomposable to form the acid catalyst; the acid precursor is selected from the group consisting of ammonium phosphate, ammonium polyphosphate, phosphites, organophosphite esters, and derivatives and mixtures thereof; the spumific is a dicyandiamide or an azodicarbonamide; the binder is selected from the group consisting of an epoxy, a polysulfide, a polysiloxane, a polysilarylene, and mixtures and derivatives thereof; and/or the first component of the composition comprises an epoxy resin and a polysulfide.

Other embodiments of the invention include substrates coated according to the above methods.

BROAD STATEMENT OF THE INVENTION

The present invention is addressed to thermally-protective, intumescent coating systems and methods therefor which provide coatings having outstanding fire protection properties at minimal film thicknesses of less than 1.27 cm (50 mils). Advantageously, such coatings are able to withstand typical sea exposure with no apparent loss in heat barrier properties, exhibit a strong adherence to hull materials, and are coatable with marine antifouling paint.

In this regard, it has been discovered that, owing to the severe thermal and convective environment developed during fire conditions, there exists a critical region for obtaining toughness, stability, and prevention of char breakthrough of an intumescent coating or paint. By "breakthrough," it is meant the point at which the char or char foam formed from the decomposition of the coating layer is broken, separated, or otherwise affected by the fire to expose the substrate directly to the flame environment. Breakthrough is usually not caused by the heat of the flame of the fire itself but by the flame environment where high shear forces are present that can erode or remove the intumescent coating or paint. The present invention therefore involves providing the coating as having a first component which forms a rigid carbonific char foam having superior toughness and rigidity, and a second component which forms an insulative carbonific char foam having a density about half of the density of the rigid carbonific foam to give superior insulation properties. In providing two foam components, one protecting the substrate from breakthrough and direct exposure to the flame environment, and the other insulating the substrate to protect it from conductive, radiant, and/or convective heating by the flame environment, the present invention affords a capability to offer superior fire protection at film thicknesses of less than 1.27 mm (50 mils).

It will be appreciated that the two foam components may be separately provided in a laminate-type arrangement as, respectively, an inner coating layer coated and cured on a surface of the substrate to form an inner film layer, and an outer coating layer coated and cured on the inner film layer to form an outer film layer. It is preferred that the inner film layer is selected as intumescently decomposing to form the rigid char foam component having superior toughness and rigidity, with the outer film layer selected to form the insulative char foam component having superior insulation properties. With such an arrangement, the inner film layer is made to remain intact until the outer film layer intumescently decomposes into the insulative char foam, which foam insulates the substrate from the heat of the flame environment, but which may be eventually broken or otherwise degraded by the aggressive nature of the same. However, at the locations whereat the outer insulative char foam layer has broken through to expose the inner film layer directly to the flame environment, the inner film layer advantageously then decomposes to form the rigid char foam which protects the substrate from direct expose to the flame environment and thereby provides an additional degree of fire protection.

Alternatively, the two foams may be provided as being formed from components blended to comprise a single coating layer which is coated and cured on the surface of the substrate to form a film layer. For forming the rigid char foam, a first component is provided in the coating layer which component is curable to form a first portion of the film layer which portion is thermally decomposable to form a char which intumesces to form the rigid char foam. For forming the insulative char foam, a second component is provided in the coating layer which component is curable to form a second portion of the film layer which portion is blended with the first portion. The second portion of the film layer is thermally decomposable to form a char which char intumesces to form the insulative char foam which foam is blended with the rigid char foam. Again, the rigid char foam component protects the substrate from breakthrough and the direct exposure to the flame environment, with the insulative char foam component protecting the substrate from conductive, radiant, and/or convective heating by the flame environment.

It is, therefore, an aspect of the present invention to provide a coating system for thermally protecting a substrate having a surface exposed to a flame environment. The coating system involves a first coating layer coated on the surface of the substrate and cured thereon to form a first film layer which layer is thermally decomposable upon exposure to the flame environment to form a first carbonific char which char intumesces to form a rigid carbonific char foam. A second coating layer is coated on the first film layer and cured thereon to form a second film layer which layer is thermally decomposable upon exposure to the flame environment to form a second carbonific char which char intumesces to form an insulative carbonific char foam having a density about half the density of the rigid carbonific char foam. Advantageously, the rigid carbonific char foam is made to form where the insulative carbonific char foam has broken through to expose the first film layer to the flame environment.

Another aspect of the present invention is to provide a method for thermally protecting a substrate having a surface exposed to a flame environment. The method involves the steps of coating the surface of the substrate with a first coating layer, and then curing the first coating layer thereon to form a first film layer which layer is thermally decomposable upon exposure to the flame environment to form a first carbonific char which char intumesces to form a rigid carbonific char foam. A second coating layer is coated on the first film layer, and then is cured thereon to form a second film layer which layer is thermally decomposable upon exposure to the flame environment to form a second carbonific char which char intumesces to form an insulative carbonific char foam having a density about half the density height of the rigid carbonific char foam. Advantageously, the rigid carbonific char foam is made to form where the insulative carbonific char foam has broken through to expose the first film layer to the flame environment.

Yet another aspect of the present invention is a coating composition for thermally protecting a substrate having a surface exposed to a flame environment on which the composition is coated and cured to form a film layer. The composition is formulated from a blend of a first and a second component. The first component is curable to form a first portion of the film layer, the first portion being thermally decomposable to form a first carbonific char which char intumesces to form a rigid carbonific char foam. The second component is curable to form a second portion of the film layer which portion is blended with the first portion. The second portion is thermally decomposable to form a second carbonific char which char intumesces to form an insulative carbonific char foam blended with the rigid carbonific char and having a density about half the density of the rigid carbonific char foam.

Still another aspect of the present invention is the provision of a method for thermally protecting a substrate having a surface exposed to a flame environment. The method involves the step of coating the surface of the substrate with a coating layer formulated from a blend of a first component and a second component. The first component is curable to form a first portion of a film layer, which portion is thermally decomposable to form a first carbonific char which char intumesces to form a rigid carbonific char foam. The second component is curable to form a second portion of the film layer which portion is blended with the first portion and is thermally decomposable to form a second carbonific char which intumesces to form an insulative carbonific char foam blended with the rigid carbonific char. The insulative char foam is provided to have a density of about half the density of the rigid carbonific char foam. The coating layer is cured on the surface of the substrate to form the film layer.

An advantage of the present invention includes a thermally-protective, intumescent coating system having improved insulation properties at minimal film thickness of about 1.27 mm (50 mils), and which is suitable for marine and other applications. Another advantage is the ability to provide laminar coating composition optimizing the fire protection properties of each of the lamina. These and other advantages will be readily apparent to those skilled in the art based upon the disclosure contained herein.

DETAILED DESCRIPTION OF THE INVENTION

The intumescent coating system and method of the present invention is provided as having a first component which is curable to form a film layer, and a second component which also is curable to form a film layer. By "curable," it is meant that the first and second components each polymerizes, cross-links, vulcanizes, or otherwise reacts to form a thermoplastic or thermosetting polymeric structure. In accordance with the precepts of the invention, the first and second component may be applied to a substrate in a laminate-type arrangement as, respectively, an inner coating layer coated and cured on a surface of the substrate to form an inner film layer, and an outer coating layer coated and cured on the inner film layer to form an outer film layer. Alternatively, the two components may be provided as blend which blend comprises a single coating layer which is coated and cured on the surface of the substrate to form a film layer. In either arrangement, the first component is selected as forming a film layer or a portion thereof which thermally decomposes upon exposure to a flame environment to form a carbonific char which intumesces to form a rigid carbonific char foam which is effective to protect the substrate from breakthrough and direct exposure to the flame environment. The second component is selected relative to the first component as forming a film layer or a portion thereof which thermally decomposes upon exposure to a flame environment to form a carbonific char which intumesces to form an insulative carbonific char foam which is effective to insulate the substrate and protect it from conductive, radiant, and/or convective heat transfer from the flame environment.

When employed in a laminate-type arrangement, it has been observed that the inner film layer formed from the curing of the first component is provided to remain intact until the outer film layer formed from the curing of the second component intumescently decomposes into an insulative char foam. Although the insulative char foam insulates the substrate from the heat of the flame environment, it is necessarily provided as having an open cellular morphology which may be eventually broken or otherwise degraded by the aggressive nature of the flames. In this regard, however, the inner and outer layers function synergistically in that at the locations where the outer insulative char foam layer has broken through to expose the inner film layer directly to the flame environment, the inner film layer advantageously then decomposes to form the rigid char foam which protects the substrate from direct expose to the flame environment and thereby provides an additional degree of fire protection. Alternatively, when the first and second components of the invention are applied as a blended layer, which layer thermally decomposes and intumesces to form a foam blend, the insulative char foam portion of the foam blend again is seen as protecting the substrate from damage from conductive, radiant, and/or convective heat transfer from the flame environment. Likewise, the rigid char foam portion of the foam blend again is seen as being effective to strengthen the foam blend and to thereby protect the substrate from the direct exposure to the flame environment which would attend any breakthrough of the foam.

As to the physical properties which the foams of the first and second component of the invention are selected to exhibit, it is preferred that the cured film of the first component intumesces into a rigid or hard carbonific char foam having a density about twice that of the insulative or soft carbonific char foam of the cured film of the second component. In this regard it will be appreciated that, as heat conduction through a gas can be several orders of magnitude lower than through a solid, the lower density foam of the second component will exhibit a thermal conductivity correspondingly lower than that of the higher density foam of the first component. However, as the foam of the cured film of the first component is twice as dense, it will be correspondingly stronger, harder, and more rigid than the necessarily softer foam of the cured film of the second component.

Quantitatively, in one aspect of the invention it is preferred that the rigid carbonific char foam of the first component is selected as having a density of between about 0.5 $g/cm^3$ and less than about 1.0 $g/cm^3$, with the insulative carbonific char foam being selected as having a density of between greater than about 0.01 $g/cm^3$ and less than about 0.5 $g/cm^3$. In another aspect of the invention, the rigid foam also will be seen as having a foam expansion height about half the expansion height of the insulative foam. In this regard, a 0.25 mm (10 mil) thick layer of the cured film of the first component has been observed to intumesce into a foam having an expansion height of 2.54 cm (1 inch), while a 0.254 mm (10 mil) thick layer of the cured film of the second component has been observed to intumesce into a foam having an expansion height of 5.08 cm (2 inches). As measured by ASTMD 1415-56T, the rigid foam of the first component is correspondingly harder as having a penetration depth of only 0.3 mm (11.8 mil) as compared to the relatively softer foam of the second component having a penetration depth of 0.7 mm (27.6 mil).

Considering the preferred formulation of the second component, the cured film thereof which thermally decomposes and intumesces into the insulative carbonific char foam component of the present invention, the component is formulated as comprising a combination of ingredients which are curable but reactive upon subsequent thermal exposure to form an incombustible residue which is expandable to a carbonific cellular foam. These ingredients, however, are selected to melt, react or decompose in a particular sequence to develop a desired viscosity profile, as well as a desired time-temperature history which is the sum of the exothermic or endothermic reactions occurring inside the coating, and of the net heat transfer into and out of the intumescing coating. Broadly, the second component of the present invention comprises a polymeric binder or vehicle, a char promoter, a dehydrating agent, a spumific or blowing agent, and optionally, pigments and solvents.

Preferably, the binder or vehicle for carrying the intumescent ingredient mixture is curable and comprises an epoxy-polysulfide system or, alternatively, an epoxy-chlorosulfonated polyethylene system, an aminoplastic system such as urea-melamine-formaldehyde, or a siloxane polymer such as a polysiloxane, a polysilarylene, or a derivative thereof, such as, for example, Siloxirane™ 2433 manufactured by Advanced Polymer Sciences, Inc., of Avon, Ohio. If an epoxy-based binder system is employed, the catalyst for the epoxy resin, preferably a polysulfide, polyamine, polyamide, or the like, may be provided as a B-stage component for addition to the A-stage resin prior to application. As the name suggests, the binder, typically in conjunction with a solvent, wets and holds together the ingredients in the coating formulation. Before cure, the binder provides for homogeneous film-forming. After cure, the binder imparts mechanical integrity to make the coating durable. The binder also assists in sealing the char for improved foaming and can contribute to the amount of char developed.

The char developed in the intumescent coating formulation of the present invention is formed by the acid-catalyzed dehydration of a polyhydric char promoter to yield a carbon char and water. For purposes of the formulation of the present invention, the polyhydric substance is a polyol, with pentaerythritol, dipentaerythritol, and derivatives and mixtures thereof being preferred. Alternatively, other char promoters, such as sugars, polyhydric phenols, or starches, may be substituted.

The polyhydric char promoter of the subject formulation is selected to contain hydroxyl functional groups which are subject to a dehydration reaction. Accordingly, a dehydrating agent, preferably an acid or an acid precursor such as an ammonium polyphosphate, a magnesium phosphate, a phosphite, or an organophosphate ester which is thermally decomposable to form an acid catalyst such as phosphoric acid, is included to dehydrate the char promoter to form water and an intermediate species such as an ester. Advantageously, the intermediate species is readily thermally decomposable to form a relatively incombustible carbonific char which may be made somewhat self-extinguishing via the liberation of carbon dioxide during the dehydration. Moreover, the latent heat of evaporation of the water condensed by the dehydration of the char promoter endothermically contributes to the insulative effects of the coating formulation.

The char developed during the acid-catalyzed dehydration of the char promoter is expanded into a carbonific char foam having a relatively low thermal conductivity which, together with the endothermic decomposition and dehydration reactions, effects the insulative efficiency of the coating. To expand the char, a blowing agent or spumific is employed for its decomposition at a desired temperature and attendant liberation of a nonflammable gas such as nitrogen. For purposes of the present invention, a blowing agent such as dicyandiamide or an azodicarbonamide is preferred, although another blowing agent such as a melamine, a guanidine, a glycine, a urea, or an organohalophosphate ester derivative, or a chlorinated or halogenated organic material such as a chlorinated paraffin, may be substituted. Of utmost importance to the formation of a thick, uniform foam, however, is that the blowing agent decomposes at a temperature higher than the decomposition temperatures of both the intermediate species and the dehydrating agent.

As to optional additives, the toughness of the carbon foam may be improved through the use of thermally-stable aminoplast resins such as urea-melamine-formaldehyde resins which form a tough matrix for the cellular mass. Similarly, glass-forming materials such as borates, silicates, mica, glass fibers and the like optionally may be added as inert, char-reinforcing agents. A zinc oxide additive may be employed to reduce the amount of smoke generated during the intumescent reaction. Additionally, the viscosity of the formulation may be thinned with a solvent such as methyl ethyl ketone, methyl isobutyl ketone, a naphtha, or a mixture thereof to facilitate spray application.

Considering now the preferred formulation of the first component, such formulation may be functionally characterized as curable to form a film which film thermally decomposes and intumesces into the hard or rigid carbonific char of the present invention selected as having a structural integrity sufficient to withstand the turbulent convective currents generated in an active fire or flame environment. In this regard, a coating marked under the name FIREX™ by the Pfizer Co. of New York, N.Y., has been found to meet the necessary functional requirements. The composition of the FIREX™ brand coating may be broadly described as a two-part, epoxy resin system comprising a first component of a filled polysulfide polymer and a second component of a filled liquid epoxy resin.

Advantageously, the coating method and system of the present invention, wherein a first component is provided to form a hard, rigid foam and a second component is provided for forming a soft, insulative foam, may be adapted for a variety of applications. For example, depending upon the application contemplated and whether insulation value or coating weight is the overwhelming consideration, the practitioner may utilize two coating layers of the second component over a primer coat layer of the first component. A topcoat of the first component also may be employed over the second component coating layers. In such an arrangement, it has been observed that the topcoat layer, the cured film of which forms a hard or rigid char foam, protects the developing foam of the inner layers of the second component from breakthrough. In this way, the insulation and char stability of each layer in the coating laminate is optimized to achieve improved fire protection capabilities. Additionally, and as aforementioned, the first and second components of the present invention may be provided in a blended form. Such a blend is attractive in that acceptable fire protection may be achieved with fewer coats and, accordingly, a reduced overall coating thickness.

As the experimental data will show, the bi-component coating system of the present invention provides superior fire protection as compared to a single component coating when applied to, for example, marine hull materials such as DURA. DURA is an advanced special hull treatment material, proprietary to the U.S. Navy, which is described in The Journal of the Acoustical Society of America, Vol. 77, No. 3, pp. 1229–1238 (1985), to comprise a polyurethane formed from a toluene diisocyanate and a polytetramethylene glycol. Indeed, in addition to providing superior fire protection, the components of the coating system of the invention have been found to adhere strongly to marine hull materials such as DURA and the like, to be coatable with antifouling paint, and to be capable of withstanding typical sea exposure with no apparent loss in insulative properties.

Additionally, the coating system of the present invention will find application in the general fire protection of homes, commercial buildings, and the like. In this regard, the inventive system may be applied as a coating to ceiling tiles which typically are supported with a metal grid, tray, or runner assembly, or with a tongue-in-groove, interlocking arrangement. During fires, it has been observed that the fibrous material from which the ceiling tiles are formed undergoes a degree of shrinkage, which shrinkage loosens the tiles and results in their falling from the ceiling. The expansion of the coating system of the invention, however, accommodates for the shrinkage of the tiles. The tiles therefore are made to remain secure in their support to lessen the chances that an occupant of the home or building will be struck by a falling tile. For such applications, it has been found that a polysiloxane or a derivative thereof is preferred for the binder component of the system as promoting a better adhesion with ceiling tile materials.

The examples to follow are illustrative of the precepts of the present invention but should not be construed in a limiting sense. All percentages and proportions are by weight, unless otherwise expressly indicated.

EXAMPLES

A pilot plant batch of an intumescent coating composition, Formula No. 45852-232, the cured film of which forms an insulative char foam according to the precepts of the present invention, was prepared as a two-part system having a weight per gallon of 10.982 lbs. (6.358 kg/l), a total solids content of 76%, and a composition as follows:

TABLE 1

| Ingredients | Description | Weight—% | Volume—% |
|---|---|---|---|
| Component A | | | |
| Dipentaerythritol | char promoter | 13.56 | 13.14 |
| Ammonium Polyphosphate[1] | dehydrating agent | 27.13 | 19.96 |
| Azodicarbonamide[2] | spumific | 1.74 | 1.39 |
| Polysulfide[3] | binder | 12.74 | 13.22 |
| Epoxy Resin[4] | binder | 12.74 | 9.70 |
| Magnesium Phosphate | acid catalyst | 7.05 | 4.23 |
| Black Iron Oxide | pigment | 0.54 | 0.15 |
| Methyl Isobutyl Ketone | solvent | 9.65 | 15.86 |
| High Flash Naphtha | solvent | 14.48 | 21.87 |
| Total Component A | | 99.63 | 99.52 |
| Component B | | | |
| Primary Amine | epoxy resin catalyst | 0.37 | 0.48 |
| Total Component B | | 0.37 | 0.48 |

[1] PHOSCHECK P30 ™ (Monsanto, St. Louis, MO)
[2] CELOGEN AZ ™ (Uniroyal, Middleberg, CN)
[3] THIOKOL LP3 ™ (Morton International, Chicago, IL)
[4] EPI-REZ 5183 ™ (Rohne Poulene, Louisville, KY)
[5] EH-330 ™ (Morton International, Chicago, IL)

Prior to the addition of the component B catalyst, component A was mixed thoroughly with a power mixer and was shaken for 30 minutes. The component B catalyst then was added to the thoroughly mixed Component A at a weight ratio (A/B) of 100/0.37. To facilitate the addition, the mixed Component A was placed under slow agitation using a power mixer with Component B being slowly added. The agitation was continued for 5 minutes. The pot life of the catalyzed mixer was found to be about 8–10 hours depending upon the ambient temperature.

Example 1

To validate the precepts of the present invention, the No. 232 formulation prepared above was used as a coating layer in combination with the commercial FIREX™ formulation selected as thermally decomposing to form the hard or rigid carbonific char of the present invention. In this regard, DURA panels were coated with various layers of the No. 232 and FIREX™ formulations, with a single FIREX™ layer coating being used as a control. The compositions of the coating layers employed were as follows:

TABLE 2

| Coating Layer | Composition | Weight—% |
| --- | --- | --- |
| FIREX ™ | Component A[1] | 57.0 |
|  | Component B[2] | 43.0 |
| Formula No. 232 | Component A | 99.63 |
|  | Component B | 0.37 |
| Topcoat Blend | FIREX ™ (as above) | 75.00 |
|  | Formula No. 232 (as above) | 25.00 |

Each of the DURA test panels was power buffed with a disc sander using 40-grit paper. The resulting appearance was a smooth, dull gray finish. To the sanded DURA panels were applied various layers of the coating compositions of Table 2. All coatings were applied using a WAGNER™ Heavy Duty Power Painter airless sprayer equipped with a 0.6-mm nozzle. Samples were coated as listed in Table 3 according to the coating and cure schedule described in Table 4.

TABLE 3

| | Dry Film Thickness, mm (mils) Sample No. | | | |
| --- | --- | --- | --- | --- |
| Coating Layer | 61 Control | 61-1 | 61-2 | 61-3 |
| FIREX ™ primer (70% in MEK)[1] | 1.27 (50) | 0.366 (14.4) | 0.284 (11.2) | 0.287 (11.3) |
| Formula No. 232 (1st coat)[2] |  | 0.257 (10.1) | 0.231 (9.1) | 0.226 (8.9) |
| Formula No. 232 (2nd coat)[2] |  | 0.300 (11.4) | 0.314 (12.4) | 0.328 (12.9) |
| FIREX ™ topcoat (67% in MEK)[3] |  |  | 0.386 (15.2) |  |
| FIREX ™ /No. 232 blend (75/25)[4] |  |  |  | 0.229 (9.0) |
| Total Dry Film Thickness | 1.27 (50) | 0.912 (35.9) | 1.22 (47.9) | 1.07 (42.1) |

[1]Material received at 80% and thinned for spraying by addition of 10% methyl ethyl ketone by weight.
[2]74% solids as manufactured
[3]Material received at 80% solids and thinned for spraying by addition of 14% methyl ethyl ketone by weight to achieve a uniform, wet coating. Although the material sprayed easily and exhibited the desired wet film properties, some solvent popping was observed which resulted in an occasional small pinhole. Accordingly, slightly less solvent, e.g., 8–10%, is indicated.
[4]FIREX ™ received at 80% solids and thinned for spraying by addition of 13% methyl ethyl ketone. Formula No. 232, 74% solids as manufactured, was blended with the FIREX ™ (75/25 FIREX ™ /No. 232 by weight).

TABLE 4

| Day | Preparation |
| --- | --- |
| 1 | Apply FIREX ™ primer (all Samples); Retain panels in spray area for 4 hours; Place panels in controlled environment (75° F., well ventilated); and Age panels 24 hours. |
| 2 | Apply 1st coat Formula No. 232 (Samples 61-1, 61-2, 61-3); Retain panels in spray area for 4 hours; Place panels in controlled environment (75° F., well ventilated); and Age panels 72 hours.[1] |

TABLE 4-continued

| Day | Preparation |
| --- | --- |
| 5 | Apply 2nd coat Formula No. 232 (Samples 61-1, 61-2, 61-3); Retain panels in spray area for 4 hours; Place pan(is in controlled environment (75° F., well ventilated); and Age panels 48 hours.[1] |
| 7 | Apply topcoats according to Table 3 (Sample 61-2, 61-3); Retain panels in spray area for 4 hours; and Place panels in controlled environment (75° F., well ventilated). |
| 9 | Remove panels for adhesion testing. |

[1]Although aging times of 48 and 72 hours are noted, and while longer aging times are acceptable provided intercoat adhesion is attained, it has been demonstrated that an aging time of 24 hours at 75° F. and less than 50% Relative Humidity is sufficient.

In summary, no unexpected or unusual conditions were encountered in the preparation of the test panels. All films were applied as wet coatings, and the cured films exhibited a good appearance.

The adhesion of each coat applied to each of the DURA panels was evaluated using a tape pull as specified in A.S.T.M. 3359. The results were as follows:

TABLE 5

| | Sample No. | | |
| --- | --- | --- | --- |
| Coating Layer | 61-1 | 61-2 | 61-3 |
| FIREX ™ primer (Adhesion after 24 hours)[1] | 5A | 5A | 5A |
| Formula No. 232 (1st coat) (Adhesion after 72 hours)[1] | 4A | 4A | 4A |
| Formula No.232 (2nd coat) (Adhesion after 48 hours)[1] | 5A | 5A | 5A |
| FIREX ™ topcoat[1] |  | 5A |  |
| FIREX ™ No. 232 blend (75/25) (Adhesion after 48 hours)[1] |  |  | 5A |

[1]Adhesion evaluated by tape pull procedure specified in A.S.T.M. 3359. Ratings of 4A and 5A are considered to be excellent.

In summary, the intercoat adhesion between each coat in the coatings, as well as the overall adhesion of the entire coating laminate, was found to be excellent.

Example 2

To validate the fire protection afforded according to the precepts of the present invention, the thermal responses of the coating systems described in Table 3 were evaluated as measured by the fire resistance of the substrate. The DURA test panels (30 cm by 30 cm, 12 inch by 12 inch) prepared in accordance with the coating protocol set forth in Tables 3 and 4, were quartered for burn testing, as was the control specimen, Sample No. 61, which was prepared as having only a single FIREX™ coating layer of a dry film thickness of 1.27 mm (50 mils).

The burn testing was conducted using a small scale fire test apparatus. The apparatus consisted of a Fisher burner (Model No. 03-900) having a 2.5 cm (1 inch) diameter diffuser cap (Model No. 03-900-10). The burner was operated with its air vents fully opened, and the gas input rate was adjusted to generate a 0.3175 cm (⅛ inch) high flame cone immediately above the cap of the burner.

Each of the 10.2 cm by 10.2 cm (4-inch by 4-inch) test specimens was centered above the burner at a 45° angle and at a nominal distance of 6.35 cm (2.5 inches) from the center of the specimen to the top of the burner. The burner then was adjusted to achieve the 0.3175 cm (⅛ inch) flame cone which was maintained under the specimen for 15 to 20 minutes. The essentially convective heat flux into the specimen was estimated at $3.51 \times 10^3$ kJ/hr/m$^2$ (30,000 Btu/hr/ft$^2$). The following results were observed:

TABLE 6

| Sample No. | Time Over Flame (minutes:seconds) | Observation |
|---|---|---|
| 61-1[1] | 3:30 | Char fully expanded and edges are separated away from FIREX ™ prier. |
| | 3:35 | FIREX ™ primer slightly visible around edges of char, but is not involved in fire or char. Primer appears slightly liquid. |
| | 3:40 | Conditions stable, no flaming or dripping. |
| | 15:00 | No change. Char bubble stable. |
| | 60:00 | No change. Test discontinued. |
| 61-2[2] | 1:00 | Large 12.7 cm (5 inch) char bubbled formed. Minor surface flaming for 30 seconds. |
| | 2:00 | Char bubble stable. |
| | 15:00 | Char bubble stable. |
| | 60:00 | Char bubble stable. No smoking or dripping. Entire panel surface intact. Test discontinued. |
| 61-3[3] | 1:00 | Some surface flaming. Small bubble formed (about half the size of bubble formed in Sample No. 61-2). |
| | 2:00 | Char bubble stable; flame extinguished. |
| | 10:00 | Coating expanded away from sample at edges where sample was quartered. Some dripping from bottom edge cut. |
| | 12:00 | Dripping stopped. |
| | 22:00 | Smoking from separation on both side edges. Center char bubble intact. |
| | 35:00 | Some smoking but no dripping. Center char bubble is stable. |
| | 60:00 | No. change. Entire surface panel intact. Test discontinued. |
| 61[4] | 5:00 | Major cracks in center of char bubble. |
| | 5:37 | Some flaming from center cracks. |
| | 9:00 | Cracks opening around bottom perimeter of char bubble and some flaming. Center cracks "healed"; no flaming. |
| | 11:00 | Flaming around char perimeter, but DURA not yet ignited. |
| | 13:30 | Smoking and passive flames continue. |
| | 16:20 | Char bubble breaks open. |
| | 17:40 | Active burning. |
| | 19:10 | DURA involved in fire, major dripping. |

TABLE 6-continued

| Sample No. | Time Over Flame (minutes:seconds) | Observation |
|---|---|---|
| | 20:30 | DURA flaming; test discontinued. |

[1]FIREX ™ primer, 2 coats No. 232, no topcoat
[2]FIREX ™ primer, 2 coats No. 232, FIREX ™ topcoat
[3]FIREX ™ primer, 2 coats No. 232, FIREX ™ /No. 232 (75/25) blend topcoat
[4]FIREX ™ control The burn test results confirm the precepts of the invention in that optimal fire protection is provided when a bi-component coating system is employed to provide two foam components, one being relatively rigid and hard to protect the substrate from breakthrough and direct exposure to the flame environment, and the other being relatively soft and insulative to protect the substrate from conductive, radiant, and/or convective heating by the flame environment. Although Sample No. 61-2 (FIREX™ topcoat over 2 coats of Formula No. 232 and 1 coat of FIREX™ primer) qualitatively appears to be preferred in maintaining the most integrity overall, i.e., even after 60 minutes there was no breaking in the coating surface, Sample No. 61-1 (2 coats of Formula No. 232 over 1 coat of FIREX™ primer) nevertheless provides fire performance improved over that attainable with the conventional intumescent coating of Sample No. 61 (FIREX™ control). Sample No. 6-3 (FIREX™/No. 232 blend topcoat over 2 coats of Formula No. 232 and 1 coat of FIREX™ primer) also exhibits improved fire protection and thereby validates another aspect of the invention.

Example 3

The fire protection afforded according to the precepts of the present invention was again validated using a second burn test procedure designed to more approximate the effects of an aggressive, large-scale fire. This procedure entailed igniting a 0.61 m by 0.61 m (2 ft by 2 ft) pan of heptane beneath a specimen held at a 45° angle to the pan. The thermal responses of 0.9 m by 0.91 m (3 ft by 3 ft) DURA samples prepared in accordance with Tables 3 and 4 were compared with that of a control specimen coated with a 1.27 mm (50 mil) FIREX™ layer. The essentially radiative heat flux into the specimen was estimated to be $1.76 \times 10^3$ kJ/hr/m$^2$ (15,000 Btu/hr/ft$^2$). The fire resistance afforded by the coatings was noted as the time in minutes to the ignition of the substrate, with the following results having been observed:

TABLE 7

| | Sample No. | | | |
|---|---|---|---|---|
| Composition | 61-1 | 61-2 | 61-3 | 61 (Control) |
| FIREX ™ primer | X | X | X | |
| Formula No. 232 (1st coat) | X | X | X | |
| Formula No. 232 (2nd coat) | X | X | X | |
| FIREX ™ topcoat | | X | | |
| FIREX ™ No. 232 (75/25) blend topcoat | | | X | |
| FIREX ™ Control (1.27 mm) (50 mil) | | | | X |

TABLE 7-continued

| Composition | Sample No. | | | |
|---|---|---|---|---|
| | 61-1 | 61-2 | 61-3 | 61 (Control) |
| Fire Resistance (min:sec to failure) | 17:40 | >24[1] | 16:23 | 7:35 |

[1]The pan of heptane supported burning for approximately 8 minutes, but would extinguish and have to be replaced. After 3 pans of heptane, the fire resistance of Sample No. 61-2 was recorded as >24 minutes. However, as the char of Sample No. 61-2 was observed still to be in excellent condition, it undoubtedly would have been stable for considerably longer than 24 minutes.

These data corroborate the validity of the precepts of the invention in that optimal fire protection again is observed to be provided when a bi-component coating system is employed to provide a rigid or hard foam component to protect the substrate from breakthrough and direct exposure to the flame environment, in conjunction with a soft or insulative foam component to protect the substrate from conductive, radiant, and/or convective heating by the flame environment. Again, although Sample No. 61-2 (FIREX™ topcoat over 2 coats of Formula No. 232 and 1 coat of FIREX™ primer) qualitatively appears to be preferred in maintaining the most integrity overall, Sample No. 61-1 (2 coats of Formula No. 232 over 1 coat of FIREX™ primer) nevertheless provides fire performance improved over that attainable with the conventional intumescent coating of Sample No. 61 (FIREX™ control). Sample No. 6-3 (FIREX™/No. 232 blend topcoat over 2 coats of Formula No. 232 and 1 coat of FIREX™ primer) also exhibits improved fire protection and thereby again validates another aspect of the invention.

Example 4

Example 4 dicloses a fire-resistant ceiling tile where a conventional or acoustical ceiling tile is coated with an intumescent coating as described below that obtained a dry film thickness of 0.86–0.97 mm (34–38 mils) which had 118–120 g dry coating weight per 0.12 $m^2$ (per $ft^2$) and yielded over a sixfold improvement in fire resistance. The fire-retardant intumescent coating was formulated as described in Table 1, except that the black iron oxide pigment was replaced with an equal amount by weight of a pigment that was a 50/50 mixture of $TiO_2$ and $Al_2O_3.3H_2O$. The resultant coating was applied to the tile by airless spray in a 50% overlap crosscoat pattern to obtain a dry film thickness of 0.91±0.05 mm (36±2 mils). Fire resistance was measured by securing a 30.5 cm×30.5 cm (1×1 foot) sample of coated tile approximately 5.08 cm (2 inches) above a Fisher Burner calibrated at 1.76×$10^3$ kJ/hr/$m^2$ (18,000 BTU/hr/$ft^2$). Results were as follows:

TABLE 8

Fire Resistance of Coated Tiles

| Material | Time (minutes to ignition) |
|---|---|
| Uncoated Tile | 10 |
| Coated Tile coating 0.91 mm (36 mils) dry | >60* |

*Test was discontinued after 60 minutes.

Example 5

Example 5 discloses a fire-resistant drywall paper and board where a conventional drywall paper and board were coated with an intumescent paint as described below where a dry film thickness of 0.30–0.38 mm (12–15 mils) yielded a twentyfold increase in fire resistance.

A fire-retardant intumescent coating for Kraft paper (facing for standard dry wall construction board) was formulated as in Example 4. The coating was applied to Kraft paper (unsupported) and to Kraft paper-covered wall board by airless spray in the same manner as in Example 4 to obtain a 0.30–0.38 mm dry (12–15 mils dry) fire-retardant intumescent coating. Adhesion to the paper in both situations was excellent.

Fire resistance was evaluated as described in Example 4, above. Results were as follows:

TABLE 9

Fire Resistance of Coated Paper and Wall Board

| Material | Time (Minutes to ignition) |
|---|---|
| Standard Dry Wall Sheet (faced with Kraft paper) | <30 seconds |
| Kraft paper (uncoated) | <30 seconds |
| Kraft paper—coated, 0.30–0.38 mm, dry (12–15 mils)) | 10 minutes |

The data for Examples 4 and 5 demonstrate excellent fire protection for a one layer system. Even better protection will be obtained by use of the multilayer system disclosed herein. An example would be coating the surface of a substrate (e.g.: conventional or acoustical ceiling tile, drywall paper and board, Kraft paper, wood, and the like) with a first coating layer cured thereon to form a first film layer which layer is thermally decomposable upon exposure to fire conditions to form a first carbonific char which char intumesces to form a first rigid carbonific char foam; and a second coating layer coated on the first film layer and cured thereon to form a second film layer which layer is thermally decomposable upon exposure to fire conditions to form a second carbonific char which char intumesces to form an insulative carbonific char foam having a density about half the density of the first rigid carbonific char foam, the first rigid carbonific char foam forming where the insulative carbonific char foam has broken through to expose the first film layer to fire conditions.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

What is claimed:

1. A coating system for thermally protecting a substrate having a surface exposed to fire conditions comprising:
   (a) a first coating layer coated on the surface of said substrate and cured thereon to form a first film layer which layer is thermally decomposable upon exposure to said fire conditions to form a first carbonific char which char intumesces to form a first rigid carbonific char foam; and
   (b) a second coating layer coated on said first film layer and cured thereon to form a second film layer which layer is thermally decomposable upon exposure to said fire conditions to form a second carbonific char which char intumesces to form an insulative carbonific char foam having a density about half the density of said first rigid carbonific char foam, said first rigid carbonific char foam forming where said insulative carbonific char foam has broken through to expose said first film layer to said fire conditions.

2. The coating system of claim 1 wherein said insulative carbonific char foam has a density of between about 0.01 g/cm$^3$ and less than about 0.5 g/cm$^3$.

3. The coating system of claim 1 wherein said second coating layer comprises:

a curable binder;

a char promoter having hydroxyl groups;

a dehydrating agent which is thermally decomposable to form an acid catalyst, said char promoter dehydrating in the presence of said acid catalyst to form an intermediate species which intermediate species is thermally decomposable to form said second carbonific char; and a spumific which is thermally decomposable to release a nonflammable, inert gas for foaming said second carbonific char into said insulative carbonific char foam, said spumific having a decomposition temperature higher than the decomposition temperatures of said dehydrating agent and said intermediate species.

4. The coating system of claim 3 wherein said coating system has a thickness of 1.27 mm (50 mils) or less.

5. The coating system of claim 1 further comprising a third coating layer coated on said second film layer and cured thereon to form a third film layer which layer is thermally decomposable upon exposure to said fire conditions to form a third carbonific char which char intumesces to form a second rigid carbonific char foam having a density about twice the density of said insulative carbonific char foam, said insulative carbonific char foam forming under said second rigid carbonific char foam.

6. The coating system of claim 1 further comprising a third coating layer formulated as a blend of said first and said second coating layers, said third coating layer being coated on said second film layer and cured thereon to form a third film layer which layer is thermally decomposable upon exposure to said fire conditions to form a third carbonific char which char intumesces to form a carbonific char foam blend having a first foam component and a second foam component having a density of about half the density of said first foam component, said insulative carbonific char foam forming under said carbonific char foam blend.

7. A method for thermally protecting a substrate having a surface exposed to a fire conditions comprising the steps of:

(a) coating said surface of said substrate with a first coating layer;

(b) curing said first coating layer on said surface of said substrate to form a first film layer which layer is thermally decomposable upon exposure to said fire conditions to form a first carbonific char which char intumesces to form a first rigid carbonific char foam;

(c) coating a second coating layer on said first film layer; and (d) curing said second coating layer on said first coating layer to form a second film layer which layer is thermally decomposable upon exposure to said fire conditions to form a second carbonific char which char intumesces to form an insulative carbonific char foam having a density about half the density height of said first rigid carbonific char foam, said first rigid carbonific char foam forming where said insulative carbonific char foam has broken through to expose said first film layer to said fire conditions.

8. The method of claim 7 wherein said carbonific char foam has a density of between about 0.01 g/cm$^3$ and less than about 0.5 g/cm$^3$.

9. The method of claim 7 wherein said second coating layer comprises:

a curable binder;

a char promoter having hydroxyl groups;

a dehydrating agent which is thermally decomposable to form an acid catalyst, said char promoter dehydrating in the presence of said acid catalyst to form an intermediate species which intermediate species is thermally decomposable to form said second carbonific char; and a spumific which is thermally decomposable to release a nonflammable, inert gas for foaming said second carbonific char into said insulative carbonific char foam, said spumific having a decomposition temperature higher than the decomposition temperatures of said dehydrating agent and said intermediate species.

10. The method of claim 7 further comprising the steps of:

(e) coating a third coating layer on said second film layer; and (f) curing said third coating layer on said second coating layer to form a third film layer which layer is thermally decomposable upon exposure to said fire conditions to form a third carbonific char which char intumesces to form a second rigid carbonific char foam having a density about twice the density of said insulative carbonific char foam, said insulative carbonific char foam forming under said second rigid carbonific char foam.

11. The method of claim 7 further comprising the steps:

(e) coating a third coating layer on said second film layer, said third coating layer formulated as a blend of said first and said second coating layers; and (f) curing said third coating layer on said second coating layer to form a third film layer which layer is thermally decomposable upon exposure to said fire conditions to form a third carbonific char which char intumesces to form a carbonific char foam blend having a first foam component, and a second foam component having a density about half the foam density of said first foam component, said insulative carbonific char foam forming under said carbonific char foam blend.

12. The substrate coated according to the method of claim 7.

13. The substrate coated according to the method of claim 10.

14. The substrate coated according to the method of claim 11.

15. A coating composition for thermally protecting a substrate having a surface exposed to a fire conditions environment on which said composition is coated and cured to form a film layer, said composition comprising a blend of:

(a) a first component which is curable to form a first portion of said film layer, said first portion being thermally decomposable to form a first carbonific char which char intumesces to form a rigid carbonific char foam; and (b) a second component which is curable to form a second portion of said film layer blended with said first portion, said second portion being thermally decomposable to form a second carbonific char which char intumesces to form an insulative carbonific char foam blended with said rigid carbonific char and having a density about half the density of said rigid carbonific char foam.

16. The coating composition of claim 15 comprising 75% by weight of said first component and 25% by weight of said second component.

17. The coating composition of claim 15 wherein said second component comprises:

a curable binder;

a char promoter having hydroxyl groups;

a dehydrating agent which is thermally decomposable to form an acid catalyst, said char promoter dehydrating in the presence of said acid catalyst to form an intermediate species which intermediate species is thermally decomposable to form said second carbonific char; and a spumific which is thermally decomposable to release a nonflammable, inert gas for foaming said second carbonific char into said insulative carbonific char foam, said spumific having a decomposition temperature higher than the decomposition temperatures of said dehydrating agent and said intermediate species.

18. A method for thermally protecting a substrate having a surface exposed to a fire conditions comprising the step of:

(a) coating said surface of said substrate with a coating layer comprising a blend of:

(i) a first component which is curable to form a first portion of a film layer, said first portion being thermally decomposable to form a first carbonific char which char intumesces to form a rigid carbonific char foam; and (ii) a second component which is curable to form a second portion of said film layer blended with said first portion, said second portion being thermally decomposable to form a second carbonific char which char intumesces to form an insulative carbonific char foam blended with said rigid carbonific char and having a density about half the density of said rigid carbonific char foam, and (b) curing said coating layer on said surface of said substrate to form said film layer.

19. The method of claim 18 wherein said composition comprises 75% by weight of said first component and 25% by weight of said second component.

20. The method of claim 18 wherein said second component of said composition comprises:

a curable binder;

a char promoter having hydroxyl groups;

a dehydrating agent which is thermally decomposable to form an acid catalyst, said char promoter dehydrating in the presence of said acid catalyst to form an intermediate species which intermediate species is thermally decomposable to form said second carbonific char; and a spumific which is thermally decomposable to release a nonflammable, inert gas for foaming said second carbonific char into said insulative carbonific char foam, said spumific having a decomposition temperature higher than the decomposition temperatures of said dehydrating agent and intermediate species.

21. The substrate coated according to the method of claim 18.

* * * * *